United States Patent
Chitiveli et al.

(10) Patent No.: US 10,289,685 B2
(45) Date of Patent: May 14, 2019

(54) INFORMATION LIFECYCLE GOVERNANCE

(75) Inventors: Srinivas V Chitiveli, Karnataka (IN);
Sathis R Marudanayagam, Bangalore (IN); B A Nagabhushan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 13/607,028

(22) Filed: Sep. 7, 2012

(65) Prior Publication Data

US 2014/0074832 A1 Mar. 13, 2014

(51) Int. Cl.
*G06F 17/30* (2006.01)
*G06F 3/06* (2006.01)

(52) U.S. Cl.
CPC ...... *G06F 17/30079* (2013.01); *G06F 3/0649* (2013.01); *G06F 17/30073* (2013.01); *G06F 3/0631* (2013.01); *G06F 17/30067* (2013.01)

(58) Field of Classification Search
CPC ......... G06F 17/30085; G06F 17/30221; G06F 3/0649; G06F 11/1448; G06F 3/0644; G06F 3/0647; G06F 3/0653; G06F 3/067; G06F 17/30073; G06F 17/30079
USPC ....................................................... 707/736
See application file for complete search history.

(56) References Cited

U.S. PATENT DOCUMENTS

| | | | |
|---|---|---|---|
| 7,680,830 B1 * | 3/2010 | Ohr | G06F 17/30085 707/999.2 |
| 7,886,048 B1 | 2/2011 | Holland et al. | |
| 8,006,061 B1 * | 8/2011 | Chatterjee | G06F 3/0605 711/170 |
| 8,006,111 B1 * | 8/2011 | Faibish | G06F 1/3221 711/114 |
| 8,041,740 B1 * | 10/2011 | Kariv | G06F 17/30516 707/791 |
| 8,332,360 B2 * | 12/2012 | Devarakonda | G06F 17/30221 707/652 |
| 9,542,424 B2 * | 1/2017 | Plattner | G06F 17/30312 |
| 2004/0034550 A1 * | 2/2004 | Menschik | G06F 19/322 705/3 |
| 2005/0198556 A1 * | 9/2005 | Tripp et al. | 714/726 |
| 2006/0010150 A1 * | 1/2006 | Shaath | G06F 17/30085 |

(Continued)

OTHER PUBLICATIONS

Mandis Beige, Murthy Devarakonda, Rohit Jain, Marc kaplan, David Pease, Jim Rubas, Upendra Sharma, and Akshat Verma, "Poicy-Based Information Lifecycle management in a Large-Scale File System", (2005), pp. 1-10.*

(Continued)

*Primary Examiner* — Merilyn P Nguyen
(74) *Attorney, Agent, or Firm* — Janaki K. Davda; Konrad, Raynes, Davda & Victor LLP (57) ABSTRACT

A case manager for managing the lifecycle of case files is provided. This case manager may serve to identify the status of a case file from a case file management system, determine whether the identified status meets or exceeds an active status threshold, and when the determined status meets or exceeds and active status threshold, channel the case file to a high performance storage resource. In embodiments, when access frequency goes down for a case file, the status may be changed and the case file may be channeled to alternative less efficient storage. When no further access to a case file is anticipated, the case file may be purged.

15 Claims, 5 Drawing Sheets

(56) References Cited

U.S. PATENT DOCUMENTS

| | | | |
|---|---|---|---|
| 2006/0206507 A1* | 9/2006 | Dahbour | G06F 17/30604 |
| 2006/0206675 A1* | 9/2006 | Sato | G06F 3/0607 |
| | | | 711/161 |
| 2006/0230044 A1* | 10/2006 | Utiger | G06F 17/30345 |
| 2007/0047439 A1* | 3/2007 | An | G06Q 10/10 |
| | | | 370/231 |
| 2007/0050667 A1* | 3/2007 | Zohar | G06F 11/1076 |
| | | | 714/6.2 |
| 2007/0116241 A1 | 5/2007 | Flocken et al. | |
| 2007/0185934 A1* | 8/2007 | Cannon | G06F 11/1451 |
| 2007/0239747 A1* | 10/2007 | Pepper | G06F 17/30864 |
| 2008/0082376 A1 | 4/2008 | Kennis et al. | |
| 2008/0148105 A1* | 6/2008 | Hisatomi | G06F 3/0604 |
| | | | 714/47.2 |
| 2009/0094424 A1* | 4/2009 | Bondurant | G06F 3/0605 |
| | | | 711/161 |
| 2009/0150168 A1* | 6/2009 | Schmidt | G06Q 50/18 |
| | | | 705/311 |
| 2009/0150866 A1* | 6/2009 | Schmidt | G06Q 90/00 |
| | | | 717/120 |
| 2009/0177622 A1* | 7/2009 | Hu | G06F 17/30336 |
| 2009/0182653 A1 | 7/2009 | Zimiles | |
| 2009/0300037 A1* | 12/2009 | Kariv | G06F 17/30286 |
| 2010/0191660 A1 | 7/2010 | Burr et al. | |
| 2010/0205014 A1* | 8/2010 | Sholer et al. | 705/4 |
| 2010/0313044 A1* | 12/2010 | Rajpal | G06F 1/3203 |
| | | | 713/320 |
| 2011/0161379 A1* | 6/2011 | Grund | G06F 17/30312 |
| | | | 707/812 |
| 2011/0289060 A1* | 11/2011 | Jinno et al. | 707/687 |
| 2011/0289287 A1* | 11/2011 | Yamamoto | G06F 3/0605 |
| | | | 711/156 |
| 2012/0173581 A1* | 7/2012 | Hartig | G06F 21/52 |
| | | | 707/781 |
| 2012/0197845 A1* | 8/2012 | Kim | G06F 17/30221 |
| | | | 707/662 |
| 2012/0303628 A1* | 11/2012 | Silvola | G06F 17/30339 |
| | | | 707/741 |
| 2012/0311260 A1* | 12/2012 | Yamagiwa | H04L 41/085 |
| | | | 711/117 |
| 2013/0024650 A1* | 1/2013 | Ambat | G06F 3/061 |
| | | | 711/209 |
| 2013/0036091 A1* | 2/2013 | Provenzano | G06F 17/30162 |
| | | | 707/624 |
| 2013/0166839 A1* | 6/2013 | Burton et al. | 711/114 |
| 2013/0179657 A1* | 7/2013 | Isomura | G06F 3/0605 |
| | | | 711/165 |
| 2013/0205068 A1* | 8/2013 | Kettner | G06F 12/0246 |
| | | | 711/103 |

OTHER PUBLICATIONS

David Reiner, Gil Press, Mike Lenaghan and David, "Information Lifecycle management: The EMC Perspective", 2004, pp. 1-4.*

Hui Liu; Case Management System Design of Infopath-Yasper & Case Study: Generic Medical process; Master's Thesis; Techische Universiteit Eindhoven, Department of Mathematics and Computer Science; Supervisor: Prof. Dr. K.M. van Hee, Ir. I.G.J. Raedts; Eindhoven, Nov. 2005.

* cited by examiner

INFORMATION LIFECYCLE GOVERNANCE

BACKGROUND

The present invention relates to information lifecycle governance, and more specifically, to information file storage and access management over the lifecycle of case file information.

Organizations regularly use case management systems to manage case information for use in their businesses. This can include using the case information for applying business rules, collaboration, and analytics. In use, these case management systems can be further used for enhancing decision making ability, and improved or informed outcomes.

Case management systems may be used to host multiple case management systems where each case management system can itself track or manage thousands of case files. For large systems, the case file load can be significant, extending into the hundreds of thousands of files, as may be common in healthcare, insurance, or other large corporate or governmental applications. These large workloads can add complexity and cost for managing the information and its ever growing volume of data. Other costs and complexities can come from the additional hardware and administration that may be needed to retain and access large volumes of information and case files.

BRIEF SUMMARY

Lifecycle information governance is described herein. In embodiments, this information can include case file information that has a predictable or somewhat predictable lifecycle. This lifecycle can include the gathering of information for the case file, the population of the case file, the access and use of the case file during an active period and perhaps the updating and reworking of the case file information as well. The lifecycle can also include the storage and retrieval of the case file and its information and the classification of the case file for selective access, archival and selective disposal.

Embodiments can provide for case files to be classified with a status wherein the status may be used to manage the storage and retrieval of the case file. This case file status can change over the lifecycle of the case file, and depending on the case file status, the location and speed by which the case file may be accessed can change or can be otherwise managed. In embodiments primary and secondary storage may be used for retaining the case files wherein the primary storage may be more proximate or otherwise more easily accessed by a case manager or a case analyzer and the secondary storage may be less proximate or otherwise less easily accessed by a case manager or a case analyzer. In some instances the case files' status may change in manners of degree for a category, from, for example, active, to very active, to moderately active. The case file status may also change between categories, for example, from active to dormant, back to active, and then to inactive or closed. And, in some embodiments, the change in category of the case file can lead the case file to be moved back and forth from or to primary storage to secondary storage.

The primary and secondary storage used in embodiments of the case management system can vary in performance, and consequently in cost as well. In embodiments, efficiencies may be obtained by storing archived and low activity case files in secondary storage while active and highly active case files may be stored in primary and ultra-primary storage. This primary and ultra-primary storage can include highly efficient storage systems using both volatile and non-volatile memory. Comparatively, in embodiments, the secondary storage may use high capacity non-volatile storage systems, including disk drive and storage tape systems.

In embodiments, the case management system may apply case statistics, criteria from an administrator, self-knowledge, and still other criteria to manage the status of a case file and determine where the case file should be stored and whether the case file should be discarded altogether at the end of its lifecycle. These statistics may be used to automatically change case file statuses, change the status of a case file after meeting certain criteria such as age, data size, uses, etc. And, these statistics can be managed by an administrator over a network, can be established when a case file is created, can be automatically adjusted by the case management system upon system changes and modifications, and may be managed using other mechanisms as well.

Embodiments may serve to improve the performance of a case management system itself. When there are a large number of cases raised, the case management system may degrade in its performance. Embodiments may serve to identify the cases that are being accessed very frequently and moving them to high performance hardware resources.

Many variations, in addition to or including the features and aspects described above may be included in embodiments of the invention. Embodiments may also include features and aspects not described above, but taught elsewhere in the specification and accompanying figures.

DETAILED DESCRIPTION

Various embodiments of information lifecycle management are provided herein. These embodiments may be combined together in various ways, including those described herein, and in other ways as well. They may further be modified with features and aspects not described herein. Thus, the embodiments provided and described herein should not be considered limiting as to the invention, which should, instead, be entitled to the full lawful scope of the claims issued.

Embodiments can include various improvements or enhancements to information lifecycle governance, including case management lifecycle governance. Features of embodiments can include identifying the lifecycle and expected progression of a case file in an information management system. Classifying or flagging case files within an information lifecycle system and managing the case files based on the flags associated with a case file. Subsystems may be used in embodiments to identify the status of a case file and to flag active, inactive and dormant cases. Subsystems in embodiments may also be used to migrate and archive active, moderately active, inactive and dormant cases to selected partitioned database tables, normal tables and archived tables respectively. Still further, the subsystems may also be used to search, restore and hold (retention) the archived cases and to manage retention schedules to defensibly dispose dormant cases/solutions. These subsystems may be embodied in hardware modules or software modules or both.

In embodiments, through active management of case file status and storage location, frequently accessed case files may be channeled to high-performance storage resources while inactive or dormant or less important case files may be channeled to lower-performance storage resources. A case file status may be determinative of where it is stored and whether or when it may be relocated from its current storage position. In embodiments, for example, when the access frequency goes down, case files may be channeled to normal performance storage resources or low performance storage resources and if a particular lower threshold is met, the solutions or case files may be archived, leaving behind flags to enable access or more efficient access.

In embodiments, a case file may contain or be linked to unique case attributes like name, policy numbers, SSN, DOB, and date of incident that help identify a specific client or customer. In addition to these structured entities, a case file may also contain unstructured artifacts like digital copies of an insurance card, a driver's license, a doctor's prescription, lab work results, pictures related to the incident, etc. Embodiments may be compatible with existing database and word processing systems including SharePoint, SQL, collaborative cloud servers, etc.

In embodiments, solutions can include a case management system that is customized for a particular vertical use: for example, a system for processing insurance claims is a Case Solution. And, in embodiments, cases and case files may be considered to include unique problems registered in a solution, which can include when an insured customer calls into a claim center to register a claim related to recent emergency care. This call can include data input from the claim into registered fields as well as artifacts from the call, such as recorded portions of the call and facsimiles received regarding the call or the claim.

Thus, embodiments may be considered to include an archiving mechanism for managing the lifecycle of solutions/cases where improvements in scalability or performance are provided. The lifecycle of a solution/case or, equivalently, a case file, can include some or all of the following stages: 1. a case is created; 2. the case is in a working and active state where data is gathered; 3. the case continues to be in a working state and gathers inputs from various stages in the workflow; 4. a decision is made on the case and the case gets closed; 5. the case now goes through a dormant state where it's not accessed anymore; 6 the case is archived on secondary storage; 6. the case might be accessed when searching for cases with similar artifacts; 7. the case is restored back to primary storage; and 8. the case reaches a state when it is no longer relevant to the mission or will never be accessed and should be deleted to make space for new cases. These stages may occur in various orders and may not occur for each case file. Similarly, different case files can spend different amounts of time at each stage and some case files may skip stages and never be deleted. Some case files may contain artifacts and others may not. Likewise, the type of data stored can vary between case files.

Figure 1:
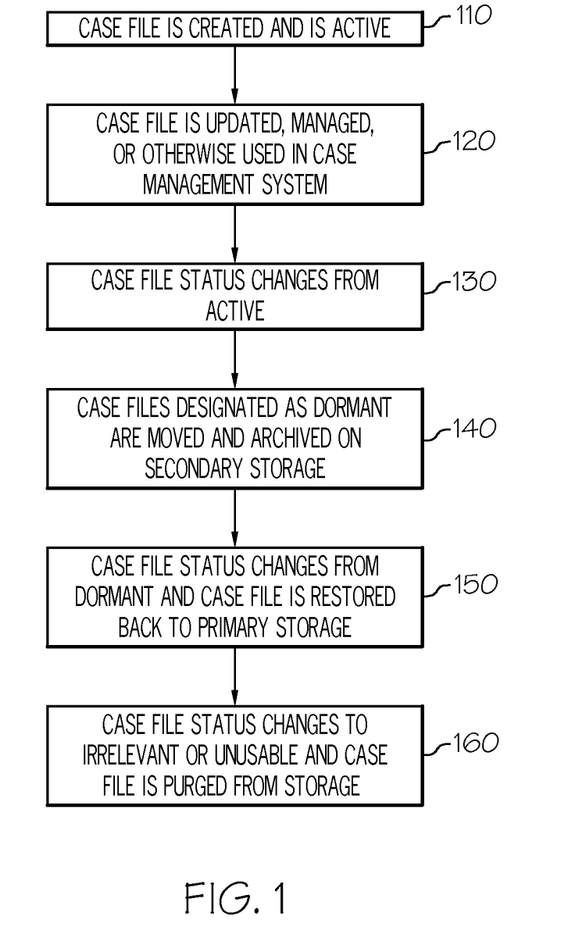
FIG. 1 shows a method for case file lifecycle management as may be employed in accord with embodiments.

FIG. 1 shows a method of case file lifecycle management stages as may be employed in embodiments. As can be seen at 110 a case file may be created and be flagged with a status of active. This case file may contain spaces to be populated with input data, it may be linked to databases with other input data and the case file may accommodate artifacts for use with the case file as well. During the life of the case file, as shown at 120, it may be updated with new data, additional information, etc. The case file may also managed or otherwise managed by the Case Management System during the lifecycle of the case associated with the case file. When the status of the case file changes, as shown at 130, its status may be changed from active to another status designation. This designation may be placed in the case file as a flag or be linked to the case file by using a database.

As shown at 140, when the status of the case file is set to dormant, the case file may be moved to a secondary storage for archiving there. And, later on, as shown at 150, if the status of the case file were to change back to active, the case file may be moved back to primary storage. When a case file is moved from or between storage locations, an indicator may be left at the old storage location to point to the new storage location of the file. Plus, if the case file were to be moved back, it may be returned to the original location or a different location on the new storage location. At the end of the lifecycle of the case file, the status flag may be changed to unusable or irrelevant and the case file may be purged from the system.

For each of these stages, as noted above, various tests or analytics may be used to assign a status to a case file. These tests or analytics may be set by an administrator, be automatically set by a case management system, and may be set by other methodologies as well.

Figure 2:
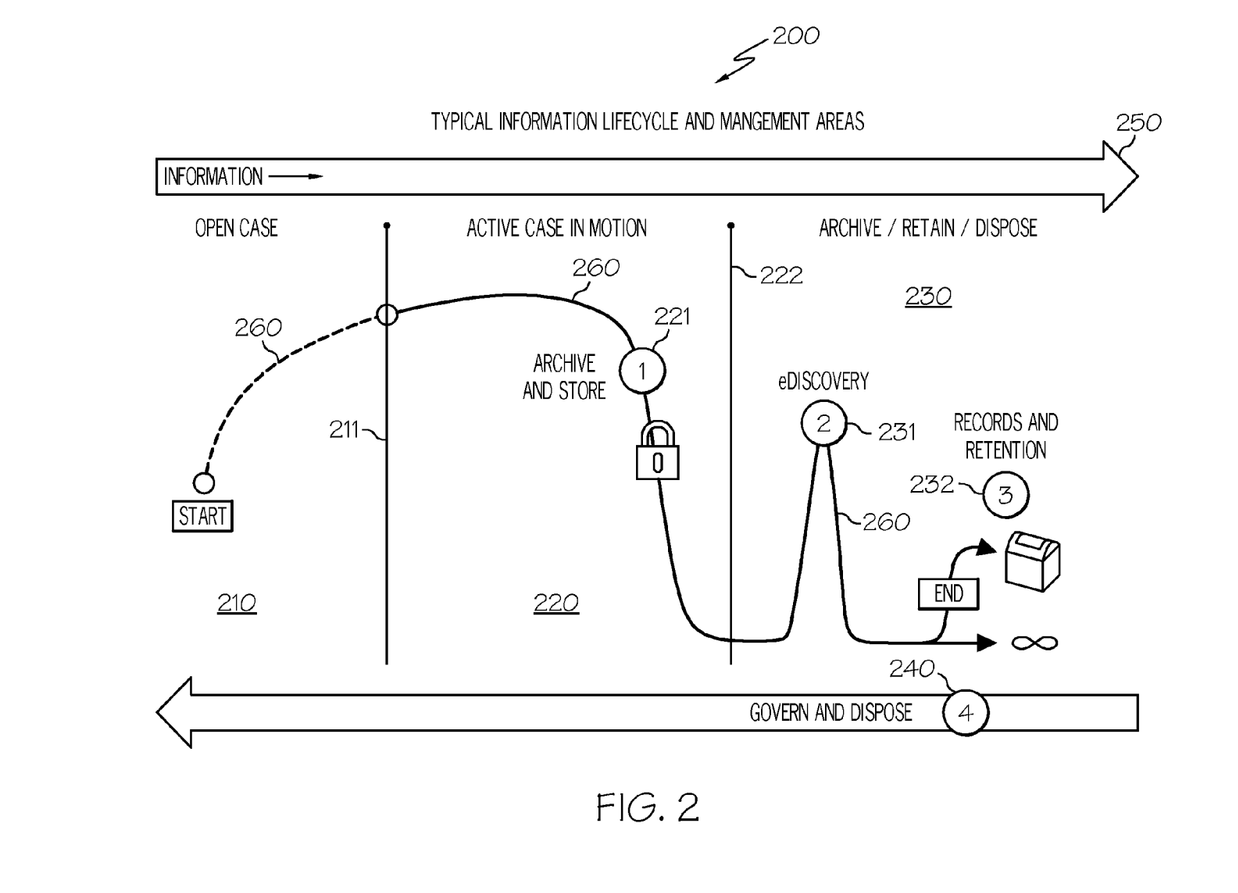
FIG. 2 shows a schematic of an exemplary lifecycle of a case file as may be encountered when managing the lifecycle of a case file in accord with embodiments.

FIG. 2 shows an exemplary lifecycle of a case file as may be encountered in embodiments. The activity of the case file is represented by the line 260 in FIG. 2. The higher off of the x-axis line 260 is, the more activity the case file is encountering. Visible in FIG. 2 are status points 221, 231, 232, and 240. Status point 1 represents that the case file is changing from an active status to a dormant status. Status point 2 reflects that the case file is changing to an active status from a dormant status, status point 3 reflects that the case file is designated in an archive state, and status code 4 is designated as indicating that disposal is recommended. Also visible in FIG. 2 are the transition lines 211 and 232, these show transitions from creation of the case file and transition to a secondary storage location for the archived case file. As can be seen, during the archive stage 230, the case file may be retained for infinity or for only a certain period of time and destroyed. As can also be seen, during the initial population of the case file, a certain threshold of information may be needed before the case file management system may begin to apply a status flag to the case management file.

In embodiments, the status assigned to a case file may designate and include: 1. very active state (most frequently used); 2. moderately active state (case is still in the workflow); 3. inactive state, but required for business compliance (case is closed but is archived for compliance reasons); and 4. dormant state, all artifacts of the case can be destroyed to create space for new cases.

In embodiments, various subsystems or modules may be employed to identify the state and optimize the management of the cases. These subsystems or modules may include: 1. a subsystem or module that leverages analytics to flag active, inactive and dormant cases; 2. a subsystem or module that may export the active, moderately active, inactive and dormant cases to partitioned database tables, normal tables and archived tables respectively (refer to the architecture in FIG. 3 below); 3. a subsystem to search, restore and hold (retention) the archived cases; and 4. a subsystem to manage retention schedules to defensibly dispose dormant cases/solutions.

Figure 3:
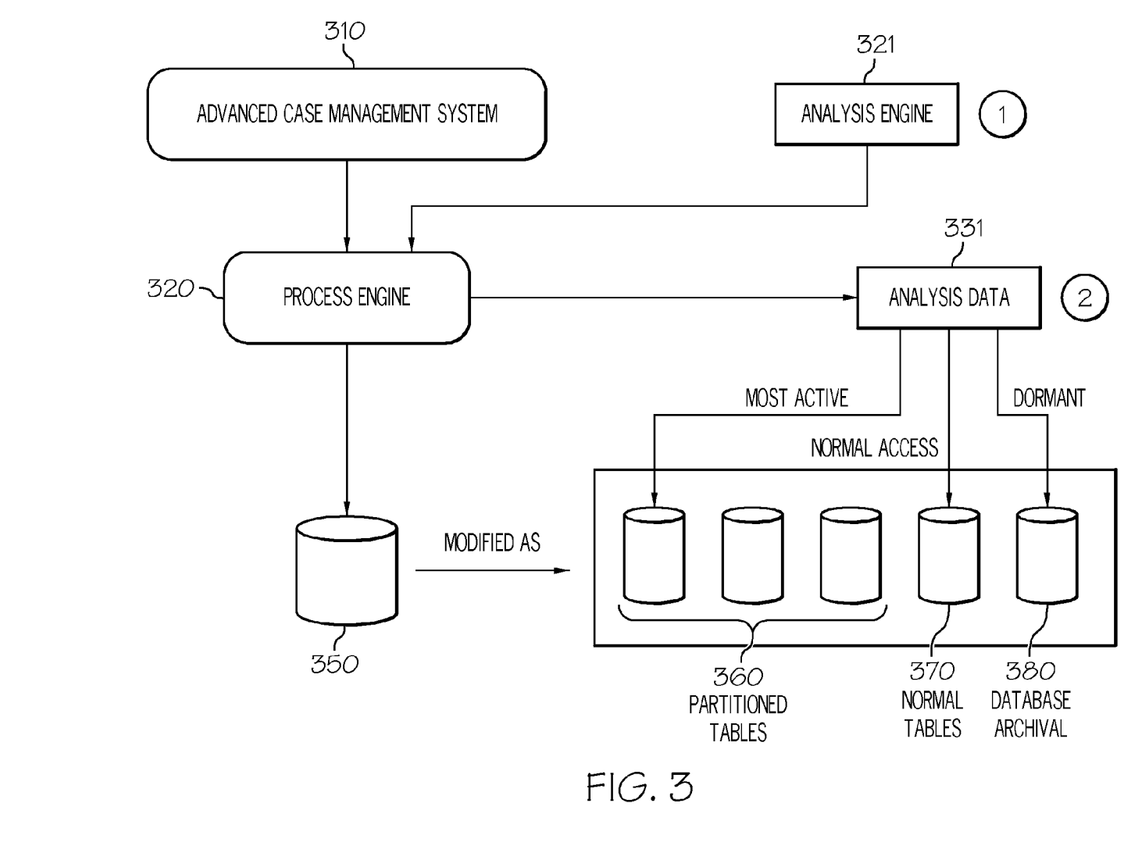
FIG. 3 shows an information case file lifecycle management system in accord with embodiments.

FIG. 3 shows various subsystems or modules as may be employed in a case file lifecycle management system in accord with embodiments. Visible in FIG. 3 are the advanced case management system 310, the analysis engine 321, the process engine 320, the database 350, analysis data 331, partitioned tables of data 360, normal tables of data 370, and a database archival 380. As can be seen, the analysis engine 321 may be apart from the case management system 310 and may be in communication with a process engine instead. This process engine may flag or analyze data or case files from a database 350 for later storage or partitioning in tables 360, 370, and 380. The arrows from analysis data 331 show that case files may be designated as most active, normal access, and dormant. These arrows further show that most active case files may be sent to partitioned data tables, while normal access case files may be stored in normal tables, and dormant case file may be stored in database archives. . . .

Figure 4:
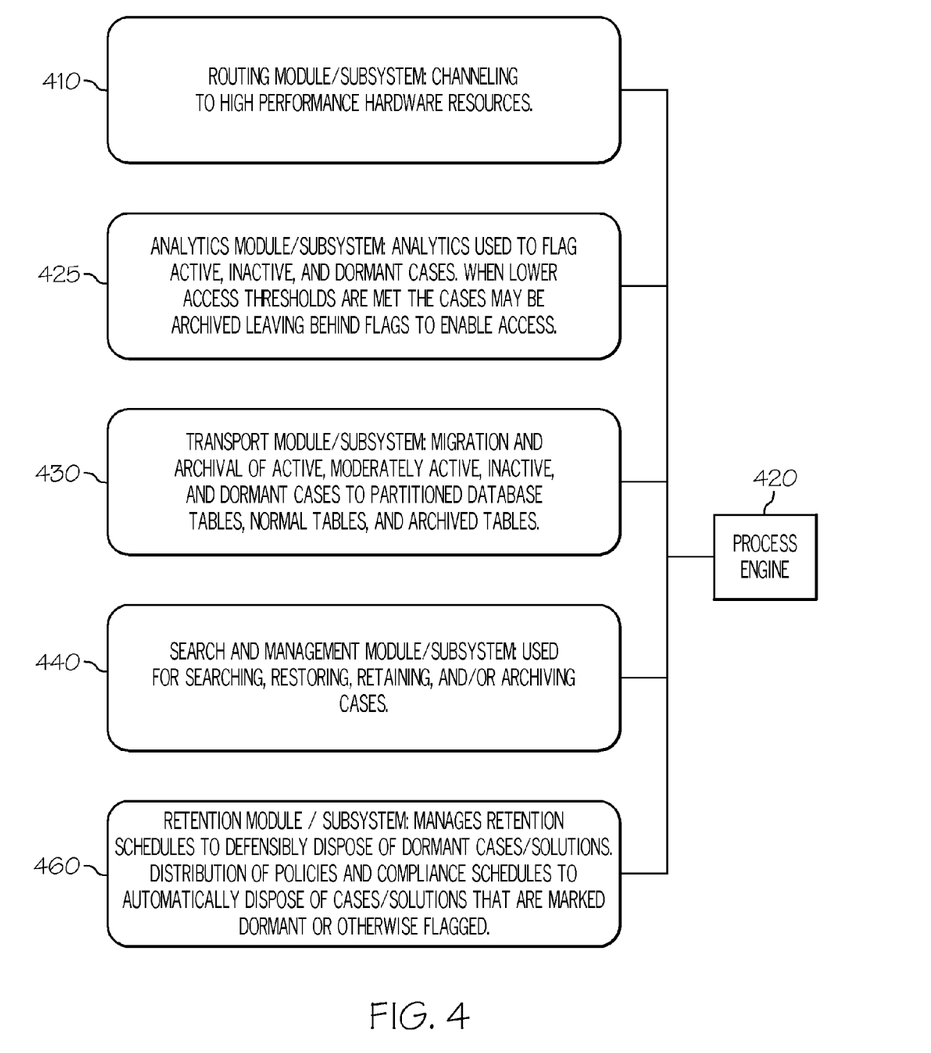
FIG. 4 shows modules as may be employed in an information case file lifecycle management system in accord with embodiments.

FIG. 4 shows modules as may be employed in embodiments. A process engine 420 may communicate with each module for performing the needed or necessary processing. The process engine may communicate with the routing module 410, the analytics module 425, the transport module 430, the search and management module 440, and the retention module 460. As indicated in FIG. 4, the routing module or subsystem 410 may be used for or function to channel high performance hardware resources and the analytics module 425 may be used to or configured for flagging active, inactive or dormant cases and when lower thresholds are met the cases may be archived behind flags to allow for quick access.

The transport module 430 may be configured to provide for migration and archiving of case files to partitioned databases and selected tables. And the search and management module 440 may be configured to search, restore, retain, and archive case. This module, like all the others, may work independently or in conjunction with other modules. Finally, the retention module 460 of FIG. 4 may be used for or configured to manage retention schedules and defensibly dispose of dormant cases or solutions. This module may also distribute policies and compliance schedules to other modules or system components to actively manage the case files or solutions.

Figure 5:
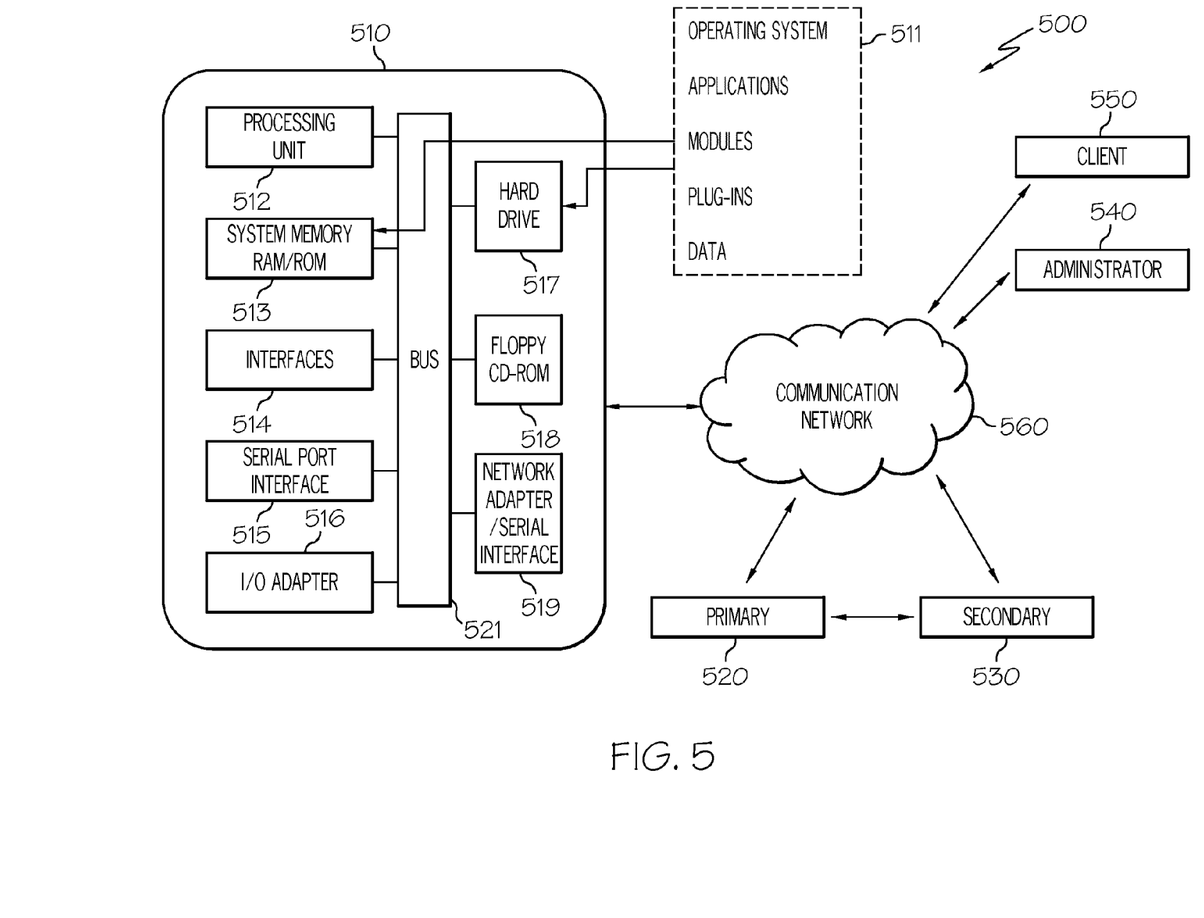
FIG. 5 shows system architecture as may be employed by an information case file lifecycle management system in accord with embodiments.

FIG. 5 shows a case file lifecycle management system 500 in accord with embodiments. Visible in FIG. 5 are the case manager 510, its operating software 511, a communication network 560, primary storage 520, secondary storage 530, administrator 540, and client 550. The storage 520 and 530 may contain the databases and table shown in FIG. 3 and the case manager may perform the various functions and steps of the engines shown in FIG. 3. As can be seen in FIG. 5, the case manager 510 may contain numerous components, including a processing unit 512, system memory 513, and storage 517. This storage may contain instructions which is periodically loaded or accessed by the processor to configure the processor for performing the various features of the disclosed embodiments.

In the embodiments, systems, subsystems, and modules described herein as well as those not described but covered by the invention, some or more of the following features and aspects may be employed. A re-designing of the persistence layer may be employed. In other words, the database tables may be created as range partitioned tables, with the Solution ID as the range partitioning key. Here, or in other embodiments, cases related to a solution may also be identified by this Solution ID and specific partitions may be preferably hosted on high-performance storage resources.

Frequently accessed solutions and cases may be identified by an analysis engine such as IBM's Case Analyzer. This case analyzer may be used to identify frequently accessed solutions and to identify active solutions for a case. Some of the cases here may have to be archived as they would have completed their logical work flow. Still further, when a specified threshold is reached, the solution may preferably be considered as a performance improvement candidate.

In embodiments, artifacts may be moved between partitions. In other words, performance improvement candidates may be moved to the data partition with the high-performance resources or removed from the database layer altogether, thus leaving out metadata references for the rare event of access.

Changes to the databases employed and the associated tables may include some or more of the following. The database may be re-designed such that: a) tables are partitioned on a unique key, commonly the Unique Identification Solution Key, hosted on high performing hardware resources; b) there are a set of normal tables, whose behavior would have been the same as when the database was not modified; c) a database archival system, such as IBM® brand Optim, which would move data to an archival system, and can be referenced by the metadata in the original database. An analysis engine may operate analyze the data on a pre-determined frequency so as to not to be performance overhead on the system. The analysis data may be captured into metadata tables under broad segregations: a) cases which have been active since the last week (very active); b) cases which have not been accessed this week but have been accessed once in the last month (normal); c) cases which have been accessed once this year (dormant); 4) very active cases would be hosted on partitioned tables, normal cases would be hosted on normal tables, and the dormant cases would be archived, ready to make use of the retrieval capabilities of the archival system.

In embodiments, the process may repeat on a pre-determined frequency and the data churn may occur as per the statistics generated.

A first exemplar:

The customer care center for an appliances manufacturing company uses case management solutions to address its customer support needs. The appliance manufacturing company has the following policies:

1. New range of products twice a year (every half of the year).

2. Products are in support for a duration of 2 years from the date of release.

3. Purchases under Customer Loyalty scheme will be supported for an additional year (3 years from the date of release).

4. Customers purchasing the latest product range will have to be serviced within 24 hours of service request.

5. Service data of products which are 4 years old will be safely disposed.

The analysis engine runs on the case management system every night and generates data on the number of cases (service requests) per product. The cases would be of two types:

a. Installation requests for the latest range of products.

b. Maintenance requests for the range of products nearing the end of support cycle.

It has been observed that very less number of cases are generated for the range of products which are in the range of 0.5-1.5 years release.

Based on the analytics generated, solutions and cases related to a) latest product range and end-of-support products are hosted on partitioned tables b) solutions and cases for 0.5-1.5 years of release are hosted on normal tables, and c) solutions and cases generated for customers under loyalty purchase are archived into Data Archival system for compliance reference. Any other data is marked and disposed from both the case management system (if not under customer loyalty) or from data archival system (if under customer loyalty).

A second exemplar:

A customer care center which handles mediclaim requests for all major hospitals in a city has different solutions for each of the hospital as per the insurance standards of the hospitals. By analysis, it has been noticed that:

a. More number of cases are being generated for alpha hospital.

b. Data regarding beta hospital can be removed from the system due to contract termination with that hospital.

Based on the above decisions, solutions and cases related to Alpha hospital would be hosted on partitioned tables, and any further cases from Alpha hospital will be also hosted on this high performance database. All other cases will be stored on normal tables. Solutions and Cases regarding Beta hospital can be moved to data archival, but this data can still be used for case analytics as a reference customer.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A case management system, comprising:
 a processor executing instructions, which when executed, cause the processor to perform processes comprising:
  assigning a status to a case file, wherein the status is any one of a very active state, a moderately active state, an inactive state, and a dormant state;
  during a lifecycle of a case file, moving the case file between different storage resources as a status of the case file changes by:
   in response to a determination that the status of the case file is the very active state, storing the case file in a partitioned table;
   in response to a determination that the status of the case file is one of the moderately active state and the inactive state, storing the case file in a normal table; and
   in response to a determination that the status of the case file is the dormant state, storing the case file in an archived table; and
  at an end of the lifecycle of the case file, purging the case file.

2. The case management system of claim 1 wherein the processor is further configured to monitor statistics of stored case files and adjust thresholds for status changes of the case files.

3. The case management system of claim 1 wherein the processor is further configured to assign case status flags to case files based on access frequency of the case files.

4. The case management system of claim 1 wherein the processor is further configured to perform functions of a process engine and an analysis engine.

5. The case management system of claim 1 wherein the lifecycle of the case file comprises a certain period of time.

6. A nontransitory computer storage medium storing instructions thereon, the instructions, which when executed, cause one or more processors to perform processes comprising:
 assigning a status to a case file, wherein the status is any one of a very active state, a moderately active state, an inactive state, and a dormant state;
 during a lifecycle of a case file, moving the case file between different storage resources as a status of the case file changes by:
  in response to a determination that the status of the case file is the very active state, storing the case file in a partitioned table;
  in response to a determination that the status of the case file is one of the moderately active state and the inactive state, storing the case file in a normal table; and
  in response to a determination that the status of the case file is the dormant state, storing the case file in an archived table; and
 at an end of the lifecycle of the case file, purging the case file.

7. The nontransitory computer storage medium of claim 6 wherein the instructions, which when executed, cause one or more processors to monitor statistics of stored case files and adjust thresholds for status changes of the case files.

8. The nontransitory computer storage medium of claim 6 wherein the instructions, which when executed, cause one or more processors to assign case status flags to case files based on access frequency of the case files.

9. The nontransitory computer storage medium of claim 6 wherein the instructions, which when executed, cause one or more processors to perform functions of a process engine and an analysis engine.

10. The nontransitory computer storage medium of claim 6 wherein the lifecycle of the case file comprises a certain period of time.

11. A process carried out by one or more processors, the process comprising:
- assigning a status to a case file, wherein the status is any one of a very active state, a moderately active state, an inactive state, and a dormant state;
- during a lifecycle of a case file, moving the case file between different storage resources as a status of the case file changes by:
  - in response to a determination that the status of the case file is the very active state, storing the case file in a partitioned table;
  - in response to a determination that the status of the case file is one of the moderately active state and the inactive state, storing the case file in a normal table; and
  - in response to a determination that the status of the case file is the dormant state, storing the case file in an archived table and at an end of the lifecycle of the case file, purging the case file.

12. The process of claim 11 wherein the process further comprises:
- monitoring statistics of stored case files and adjusting thresholds for status changes of the case files.

13. The process of claim 11 wherein the process further comprises:
- assigning case status flags to case files based on access frequency of the case files.

14. The process of claim 11 wherein the process further comprises:
- performing functions of a process engine and an analysis engine.

15. The process of claim 11 wherein the lifecycle of the case file comprises a certain period of time.

* * * * *